(12) United States Patent
Chen et al.

(10) Patent No.: US 9,537,818 B2
(45) Date of Patent: Jan. 3, 2017

(54) ENHANCED DHCP METHOD

(71) Applicant: MediaTek Inc., Hsin-Chu (TW)

(72) Inventors: Yi-Lun Chen, Changhua (TW);
Kuan-Ming Lin, Hsinchu (TW);
Yuan-Chieh Lin, Taipei (TW);
Ming-Cong Sun, Taipei (TW);
Huang-Yi Yu, New Taipei (TW);
Tsung-Chieh Chang, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 140 days.

(21) Appl. No.: 14/277,178

(22) Filed: May 14, 2014

(65) Prior Publication Data

US 2014/0344475 A1    Nov. 20, 2014

Related U.S. Application Data

(60) Provisional application No. 61/823,482, filed on May 15, 2013.

(51) Int. Cl.
*H04L 29/12* (2006.01)
*H04L 12/911* (2013.01)

(52) U.S. Cl.
CPC ......... *H04L 61/2015* (2013.01); *H04L 47/741* (2013.01); *H04L 61/2053* (2013.01)

(58) Field of Classification Search
CPC ..... H04L 61/20–61/2076; H04L 47/00–47/745
See application file for complete search history.

(56) References Cited

U.S. PATENT DOCUMENTS

| | | | | |
|---|---|---|---|---|
| 6,118,768 A | * | 9/2000 | Bhatia | H04L 12/2856 370/254 |
| 7,577,146 B2 | | 8/2009 | Arberg et al. | |
| 8,260,902 B1 | * | 9/2012 | DeGraaf | H04L 63/0272 709/220 |
| 8,782,211 B1 | * | 7/2014 | Sharma | H04L 67/1036 709/224 |

(Continued)

FOREIGN PATENT DOCUMENTS

| | | |
|---|---|---|
| CN | 1435974 | 8/2003 |
| CN | 101060714 | 10/2007 |
| CN | 101098346 | 1/2008 |

OTHER PUBLICATIONS

English language machine translation of CN 1435974 (published Aug. 13, 2003).

(Continued)

*Primary Examiner* — Nicholas Taylor
*Assistant Examiner* — Clayton R Williams
(74) *Attorney, Agent, or Firm* — McClure, Qualey & Rodack, LLP

(57) ABSTRACT

DHCP methods adopted by a slave device connected to a host device are disclosed. The method includes: receiving a DHCP discover message from the host device; in response to the DHCP discover message, transmitting a DHCP offer message containing a DHCP renewal time configuration to the host device; receiving a DHCP request message from the host device; and in response to the DHCP request message, transmitting a DHCP acknowledgement message containing a client Internet Protocol (IP) address and the DHCP renewal time configuration to the host device.

9 Claims, 11 Drawing Sheets

(56) References Cited

U.S. PATENT DOCUMENTS

| | | | |
|---|---|---|---|
| 2003/0145073 A1 | 7/2003 | Lee | |
| 2003/0172307 A1* | 9/2003 | Henry | H04L 61/2015 713/171 |
| 2003/0182665 A1* | 9/2003 | Kwon | H04L 41/0253 725/111 |
| 2004/0177133 A1* | 9/2004 | Harrison | H04L 61/2015 709/220 |
| 2005/0021667 A1* | 1/2005 | Conway-Jones | H04L 29/06 709/217 |
| 2005/0157703 A1* | 7/2005 | Roh | H04L 29/06 370/352 |
| 2006/0274693 A1* | 12/2006 | Nikander | H04W 36/0016 370/331 |

OTHER PUBLICATIONS

English language machine translation of CN 101060714 (published Oct. 24, 2007).
English language machine translation of CN 101098346 (published Jan. 2, 2008).

* cited by examiner

ENHANCED DHCP METHOD

CROSS REFERENCE TO RELATED APPLICATIONS

This Application claims priority of U.S. Provisional Application No. 61/823,482, filed on May 15, 2013, and the entirety of which is incorporated by reference herein.

BACKGROUND OF THE INVENTION

Field of the Invention

The present invention relates to dynamic host configuration protocol (DHCP) methods.

Description of the Related Art

In a network environment, an Internet Protocol (IP) address is issued to a device connected to the network for a set interval. After the set interval, the device is required to renew the IP address or acquire a new one from the network. The dynamic host configuration protocol (DHCP) is a network protocol used by a DHCP server on a network to allocate IP addresses to computers without a network administrator.

With the advent of mobile computing devices and the desire to acquire a reliable network connection under various conditions, mobile computing devices such as mobile phones and laptop computers must be able to promptly recognize a network event when a network change in the network connection state or the IP address information takes place. As a consequence, the mobile computing devices can configure the network setting in a timely manner according to the network change, thereby delivering a reliable network connection.

BRIEF SUMMARY OF THE INVENTION

A detailed description is given in the following embodiments with reference to the accompanying drawings.

A method adopted by a slave device connected to a host device is disclosed, comprising: receiving a DHCP discover message from the host device; in response to the DHCP discover message, transmitting a DHCP offer message containing a DHCP renewal time configuration to the host device; receiving a DHCP request message from the host device; and in response to the DHCP request message, transmitting a DHCP acknowledgement message containing a client Internet Protocol (IP) address and the DHCP renewal time configuration to the host device.

Another embodiment of a method adopted by a slave device connected to a host device is provided, comprising: receiving a DHCP discover message from the host device; in response to the DHCP discover message, transmitting a DHCP offer message containing a DHCP lease time configuration to the host device; receiving a DHCP request message from the host device; and in response to the DHCP request message, transmitting a DHCP acknowledgement message containing a client IP address and the DHCP lease time configuration to the host device; wherein the DHCP lease time configuration is less than 2 minute.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
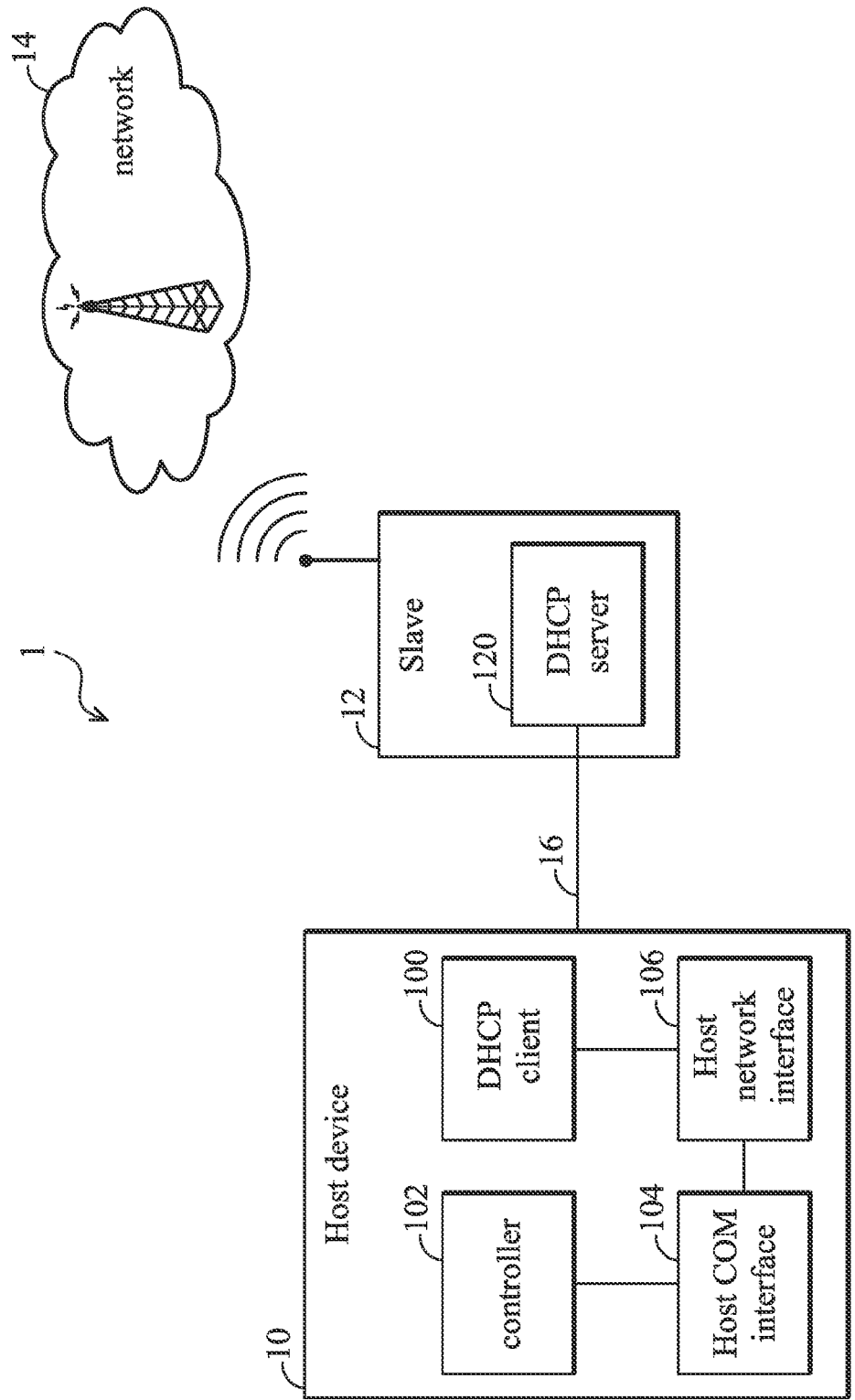
FIG. 1 is a block diagram of a network system 1 according to an embodiment of the invention.

FIG. 1 is a block diagram of a network system 1 according to an embodiment of the invention, comprising a host device 10, a slave device 12, and a network 14. The host device 10 may include, but not limited to, a personal computer (PC) system, laptop computer system, personal data assistant (PDA) system, smart phone system, handheld game console system, consumer electronics system, or any type of computing system that is able to access through a packet-switched data communications network. The slave device 12 may be a modem, such as a mobile broadband modem or a wireless modem, which may be embedded into or external to the host device 10, and communicates to the network 14 through a telecommunication protocol. The slave device 12 may be connected to the host device 10 through a host interface 16. The host interface 16 may be, but not limited to, a Universal Serial Bus (USB), a Secure Digital Input/Output (SDIO) or an internal bus. The network 1414 may include, but not limit to, a corporate intranet network, local area network, home network, Internet, or a mobile telephone system such as a General packet radio service (GPRS), Universal Mobile Telecommunications System (UMTS), High Speed Packet Access (HSPA) system, Enhanced Voice-Data Optimized or Enhanced Voice-Data Only (Ev-DO, EV,EVDO) system, and WiMAX (Worldwide Interoperability for Microwave Access) system.

Accordingly, when the host device 10 firstly connects to the network 14, a DHCP procedure is carried out to obtain an IP address for the host device 10 to access the network 14. Therefore, once the slave device 12 is plugged into or connected to the host device 10, a DHCP procedure will be initiated by the host device 10 to acquire an IP address and access the network 14 using the acquired IP address. Specifically, the IP address is assigned by the slave device 12 to the host device 10.

The host device 10 includes a controller 102, a DHCP client 100, a host COM interface 104, and a host network interface 106. The slave device 12 includes a DHCP server 120. The DHCP client 100 is configured to initiate the DHCP procedure through the host network interface 106 upon detecting the slave device 12. The controller 102 is configured to monitor and control operations of the slave device 12 through the host COM interface 104. For example, the controller 102 may monitor a connection status of the slave device 12 and display the connection status in the form of an icon shown on a display of the host device 10. The controller 102 may contain a network status-aware operating system such as Microsoft Windows or a network status-unaware operating system such as the Mac OS. When the controller 102 is a network status-aware operating system, it can promptly and accurately monitor whether the host device 10 is connected to the network 14. When the controller 102 is a network status-unaware operating system, it cannot promptly and accurately monitor whether the host device 10 is connected to the network 14, i.e., the controller 102 displays the network status as connected upon slave device 12 is plugged in, even when the network link to the network 14 has not yet established or has been disconnected. The embodiment of the invention allows the controller 102 to accurately determine when to request or update an IP address from a DHCP server, regardless the controller 102 adopting a network status-aware or network status-unaware operating system.

The DHCP server 120 manages a pool of IP addresses which can be assigned to the DHCP clients. The controller 102, the DHCP client 100, the host COM interface 104, the host network interface 106, and the DHCP server 120 may be implemented by hardware circuits or instruction codes executable by a processor.

A DHCP procedure is detailed as follows. In order to acquire an IP address on the network 14, the DHCP client 100 broadcasts a DHCP discover packet through the Host network interface 106 so that the DHCP, serving in the domain of network 14, will receive it. The DHCP discover packet includes the DHCP client's hardware address, which is unique on the network 14. The DHCP server 120 of the slave device 12 receives the DHCP discover packet and responds with a DHCP offer packet which contains an IP address that the DHCP client 100 can use, along with the subnet mask, the lease time, the hardware address of the DHCP client 100, and other parameters. The DHCP offer packet is transmitted back to the DHCP client 100 by the DHCP server 120. The DHCP client 100 can recognize that the DHCP offer is intended for it when receiving the DHCP offer packet which contains the same hardware address as in the DHCP discover packet.

When the DHCP server 120 of the slave device 12 receives the DHCP request packet, it recognizes that its offer has been accepted by the DHCP client 100 and assigns the IP address to the DHCP client 100 and sends a DHCP acknowledgement packet to the DHCP client 100. Upon receiving the DHCP acknowledgement packet, the DHCP client 100 configures its TCP/IP layer with the assigned IP address.

The controller 102 of the host device 10 may be an operating system (OS) such as Microsoft windows, Linux, or Mac OS thereon, running on the computer. The host controller 102 communicates with the DHCP client 100 through the host COM interface 104. In some embodiments, the controller 102 can directly communicate with DHCP client or control DHCP client.

The DHCP server 120 can configure a DHCP lease time or a DHCP renewal time to short intervals, such that the controller 102 can update the assigned IP address frequently according to the configured DHCP lease time or the DHCP renewal time. The DHCP lease time is defined as a time duration which an IP address offered by a DHCP server 120 to a connected DHCP client 100 is valid. If the DHCP client 100 does not renew the lease at DHCP lease time expiry, the IP address will be revoked. This brings about the DHCP renewal time, which is defined as a time period that the DHCP client 100 uses to renew the network IP address by contacting the DHCP server 120 that sent the original IP address to the client 10. The renewal packet is directly to the DHCP server 120. The DHCP client 100 can renew the lease time as many times as required. Specifically, the DHCP lease time is generally configured as being less than 2 minutes, and the DHCP renewal time is generally configured as being less than 1 minute, allowing the controller 102 to update the IP address in less than 1 minute's time interval.

The controller 102 can compute the DHCP renewal time based on the DHCP lease time. The DHCP renewal time is configured to be less than the DHCP lease time, so that during a lease period, the controller 102 can start a renewal process to continue using the IP address after the lease time expires. If the controller 102 fails to renew the IP address received from the original DHCP server 120 in the designated lease period, the controller 102 can begin the process of renewal from another DHCP server (not shown). The renewal time may be set as half of the lease time. For example, if the IP address is leased for 2 minutes, after 1 minute the controller 102 will send a DHCP request directly to the DHCP server 120 located in the slave device 12. The DHCP renewal time and/or lease time can be configured in the DHCP offer and/or DHCP acknowledgement messages by the DHCP server 120. Details for setting the DHCP renewal time and/or lease time are disclosed in DHCP methods 7 and 8 in FIGS. 7 and 8.

Ideally, the host 10 determines that a network link to the network 14 has been established upon receiving a network LINK UP message, and determines the disconnection from the network 14 when receiving a network LINK DOWN message. However, it is noted when the host device 10 operates with certain operating systems such as an Mac OS, the Mac OS regards it as connected to the network 14 as soon as the DHCP discover message is sent. That is, the Mac OS considers a network link has been established before a network LINK UP message is received. Moreover, once the Mac OS considers the network link is established, it views itself as connected even when a network LINK DOWN message has been received. In other words, the host device 10 running the Mac OS regards itself as being connected regardless of the connection status. As a consequence, the host device 10 cannot accurately initiate an IP renewal procedure upon a network disconnection.

The DHCP server 120 can queue the DHCP discover and DHCP request messages when the network link has not yet been established, and respond to the queued DHCP messages with a DHCP offer or DHCP acknowledgement message once the network link is established. In doing so, the host device 10 can obtain the IP address after the slave device 12 is linked up with the network 14. It is worth noting the network link is not established before the slave device 12 receives the network LINK UP message and/or after the slave device 12 receives the network LINK DOWN message. The network link may be a wired or wireless connection between the DHCP slave device 12 and the network 14. In some embodiments, in a network disconnection situation, the DHCP server 120 can send a mock IP address containing the IP address before the network disconnection occurs to the host device 10, while waiting for the network link reconnecting. In other embodiments in the network disconnection situation, the DHCP server 120 can employ a DHCP negative acknowledgement message to force the host device 10 to restart a DHCP procedure and reconnect the network 14. Details for queuing the DHCP discovery and DHCP request messages are disclosed in DHCP methods 9 and 10 in FIGS. 9 and 10.

By adopting short-interval renewal time or lease time, as well as queued DHCP messages, the slave device 12 allows the host device 10 to receive updated IP address from the network 14, and DHCP server 120 promptly and accurately, providing a robust and reliable network connection to the host device 10.

Figure 2:
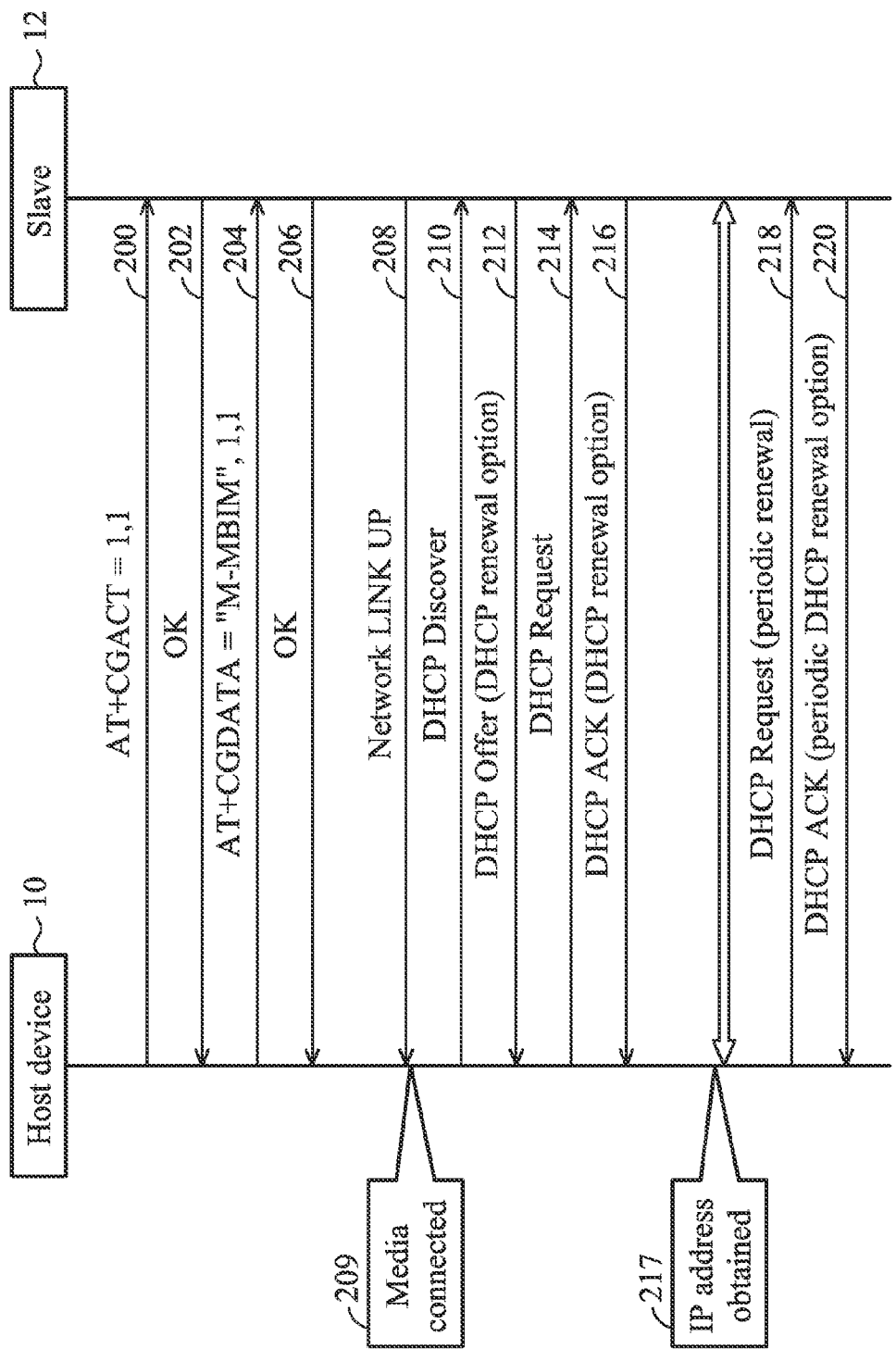
FIG. 2 is a message sequence chart of a DHCP method 2 according to an embodiment of the invention.

FIG. 2 is a message sequence chart of a DHCP method 2 according to an embodiment of the invention, incorporating the host device 10 and slave device 12 in FIG. 1. The host device 10 operates with a network status-aware operating system such as Microsoft Windows.

When the DHCP method 2 starts, the DHCP client has not yet established a network link with the network, thus the host device 10 issues network commands 200 and 204 via the slave device 12 to establish a network link with the network 14 and receives corresponding acknowledgements 202 and 206 from the network 14, also via the slave device 12.

When the network link is successfully established between the slave device 12 and the network 14, the slave device 12 will receive a network LINK UP message 208 from the network 14 and forward the network LINK UP message 208 to the host device 10, informing the host device 10 of the network connection establishment (209).

Knowing the network link is established, the host device 10 can initiate a DHCP procedure to acquire an IP address. The host device 10 sends a DHCP discover message 210 to the slave device 12, enquiring available DHCP servers on the network. In response, the host device 10 receives a DHCP offer message 212 from the slave device 12. The slave device 12 is configured to include a DHCP renewal option or a DHCP lease time parameter to the DHCP offer message 212, and deliver the DHCP offer message to the host device 10. The DHCP renewal option may be set to be less than 1 minutes. The DHCP lease time parameter may be set to be less than 2 minutes.

After accepting the DHCP offer message 212, the host device 10 can acquire the DHCP renewal time or leased time parameter, and issue a DHCP request message 214 in a period set by the DHCP renewal time or lease time parameter to request for or renew an IP address. When the lease time parameter is included in the DHCP offer message 212, the DHCP renewal time may be set as half of the lease time. For example, the lease time parameter may be set as 2 minutes, subsequently the host device 10 may issue a DHCP request message to the slave device 12 every minute to request for or renew an IP address. The slave device 12 in return, responds with a DHCP acknowledgement message 216 to the host device 10. The DHCP acknowledgement message 216 contains an IP address which the host device 10 can use. The slave device 12 is configured to further include the DHCP renewal option or DHCP lease time parameter to the DHCP acknowledgement message 216 to send to the host device 10.

After receiving the DHCP acknowledgement message 216, the host device 10 can obtain the assigned IP address (217), and will use the assigned IP address to communicate with the network. Further, the host device 10 will renew the lease time of the IP address in a period set by the DHCP renewal time or lease time parameter. For example, the renewal time parameter may be set at 30 seconds, subsequently the host device 10 may issue a DHCP request message to the slave device 12 every 30 seconds.

The IP address renewal is illustrated by sending a DHCP request message 218 from the host device 10 to the slave device 12, and returning a DHCP acknowledgement message with a DHCP renewal parameter from the slave device 12 to the host device 10.

The DHCP method in FIG. 2 employs the slave device 12 to send a DHCP renewal or lease time parameter to the host device 10 in the DHCP offer message or the DHCP acknowledgement message, allowing the network status-aware host device 10 to update or renew the IP address on the network promptly, leading to a robust and reliable network connection.

Figure 3:
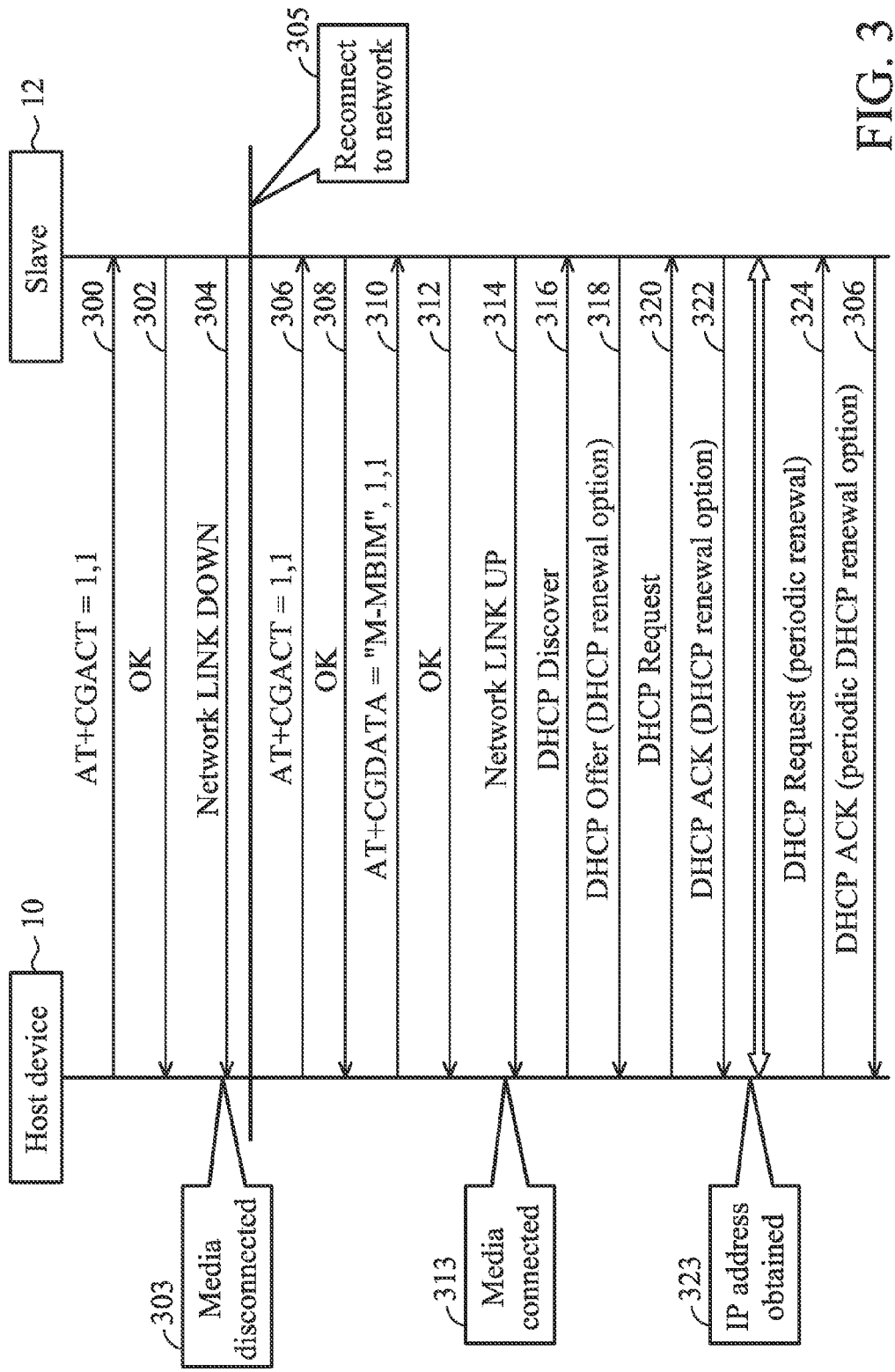
FIG. 3 is a message sequence chart of a DHCP method 3 according to another embodiment of the invention.

FIG. 3 is a message sequence chart of a DHCP method 3 according to another embodiment of the invention, incorporating the host device 10 and slave device 12 in FIG. 1. The host device 10 operates with a network status-aware operating system such as the Microsoft Windows. The DHCP method 3 is adopted when the network link is disconnected a network reconnection is required.

When the DHCP method 3 starts, a network link has already been established between the slave device 12 and the network 14. Then a network disconnection occurs and a network LINK DOWN message 304 is passed from the slave device 12 to the host device 10, informing the host device 10 of the broken network link (303), and a network reconnection is required.

Accordingly, the host device 10 receives the network LINK DOWN message 304 and conducts another DHCP procedure by Steps 306 through 306, the operations and configurations of Steps 306 through 306 are identical to the those of Steps 200 through to 220 in FIG. 2, reference therefore can be directed to the preceding paragraphs and will not repeated here again for brevity.

Like the DHCP method 2, the DHCP method 3 employs the slave device 12 to send a DHCP renewal or lease time parameter to the host device 10 in the DHCP offer message or the DHCP acknowledgement message, allowing the network status-aware host device 10 to update or renew the IP address on the network in a timely manner, leading to a robust and reliable network connection.

Figure 4:
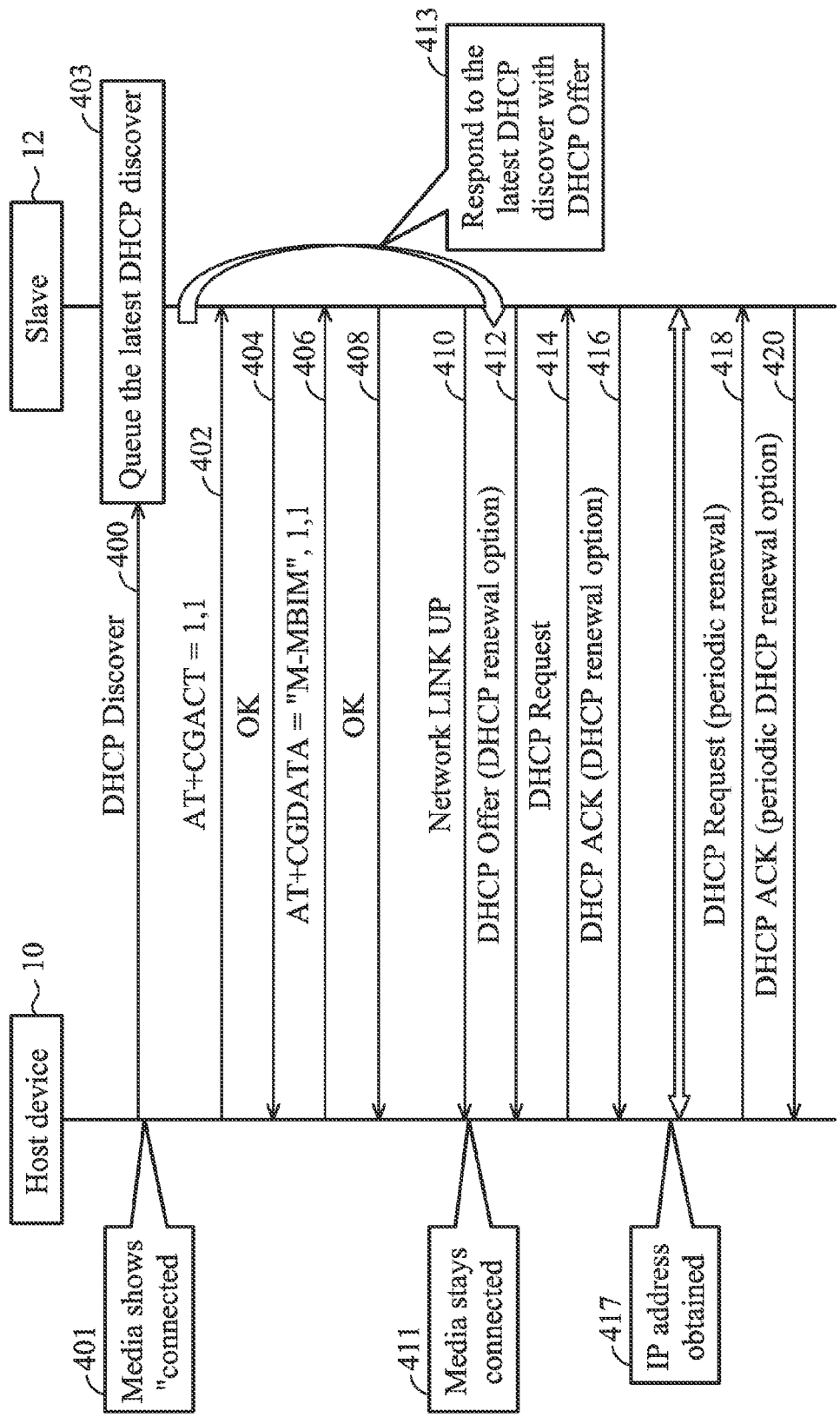
FIG. 4 is a message sequence chart of a DHCP method 4 according to another embodiment of the invention.

FIG. 4 is a message sequence chart of a DHCP method 4 according to another embodiment of the invention, incorporating the host device 10 and slave device 12 in FIG. 1. The host device 10 operates with a network status-unaware operating system such as the Mac OS. The DHCP method 4 is adopted when the DHCP client is just connected to the network and required to establish a network connection and acquire a network IP address.

When the DHCP method 4 starts, the DHCP client has not yet established a network link with the network, the host device 10 is required to link with the network and obtain an IP address from the network. The host device 10 do so by firstly sending a DHCP discover message 400, and then exchanges network messages 402 through 408 with the network 14 via the slave device 12 for connecting to the network 14. The host device 10 regards itself as being connected to the network (401) upon sending the DHCP discover message 400 to the slave device 12. Since the network link has not yet been connected, the host device 10 will not receive a DHCP offer message and may send the DHCP discover message 400 repeatedly in an attempt to get a DHCP offer response from a DHCP server. The network card is configured to queue the latest DHCP discover message 400 (403) until the network link to the network 14 is connected. The slave device 12 can send a network LINK UP message 410 to the host device 10 when the network link is successfully established. Nevertheless, since the host device 10 has already regarded itself as being connected, it will continue considering itself as staying connected with the network 14 (411).

In response to the delivered DHCP discover message 400, the slave device 12 can send a DHCP offer message 412 to the host device 10. The slave device 12 is configured to include a DHCP renewal option or a DHCP lease time parameter in the DHCP offer message 412. The DHCP renewal option may be set to be less than 1 minutes. The DHCP lease time parameter may be set to be less than 2 minutes.

After accepting the DHCP offer message 412, the host device 10 can acquire the DHCP renewal time or leased time parameter, and issue a DHCP request message 414 to request for or renew an IP address in a period set by the DHCP renewal time or lease time parameter. When the lease time parameter is included in the DHCP offer message 412, the DHCP renewal time may be set as half of the lease time. For example, the lease time parameter may be set as 2 minutes, subsequently the host device 10 may issue a DHCP request message to the slave device 12 every minute to request for or renew an IP address. The slave device 12 then transmits a DHCP acknowledgement message 416 to the host device 10. The DHCP acknowledgement message 416 contains an IP address which the host device 10 can use. The slave device 12 is configured to further include the DHCP renewal option or DHCP lease time parameter to the DHCP acknowledgement message 416, and send the DHCP acknowledgement message 416 to the host device 10.

Upon receiving the DHCP acknowledgement message 416, the host device 10 can obtain the assigned IP address (417), and will use the assigned IP address to carry on communications with the network. Further, the host device 10 will renew the lease time of the IP address in a period set by the DHCP renewal time or lease time parameter. For example, the renewal time parameter may be set as 30 seconds, and subsequently the host device 10 may issue a DHCP request message to the slave device 12 every 30 seconds to renew the IP address.

The IP address renewal is illustrated by sending a DHCP request message 418 from the host device 10 to the slave device 12, and responding a DHCP acknowledgement message with a DHCP renewal parameter from the slave device 12 to the host device 10.

The DHCP method in FIG. 4 employs the slave device 12 to queue the DHCP discover message from the host device 10 prior to establishing the network link, and send a DHCP renewal or lease time parameter to the host device 10 by the DHCP message, allowing the network status-aware host device 10 to update or renew the IP address promptly and accurately, leading to a robust and reliable network connection.

Figure 5:
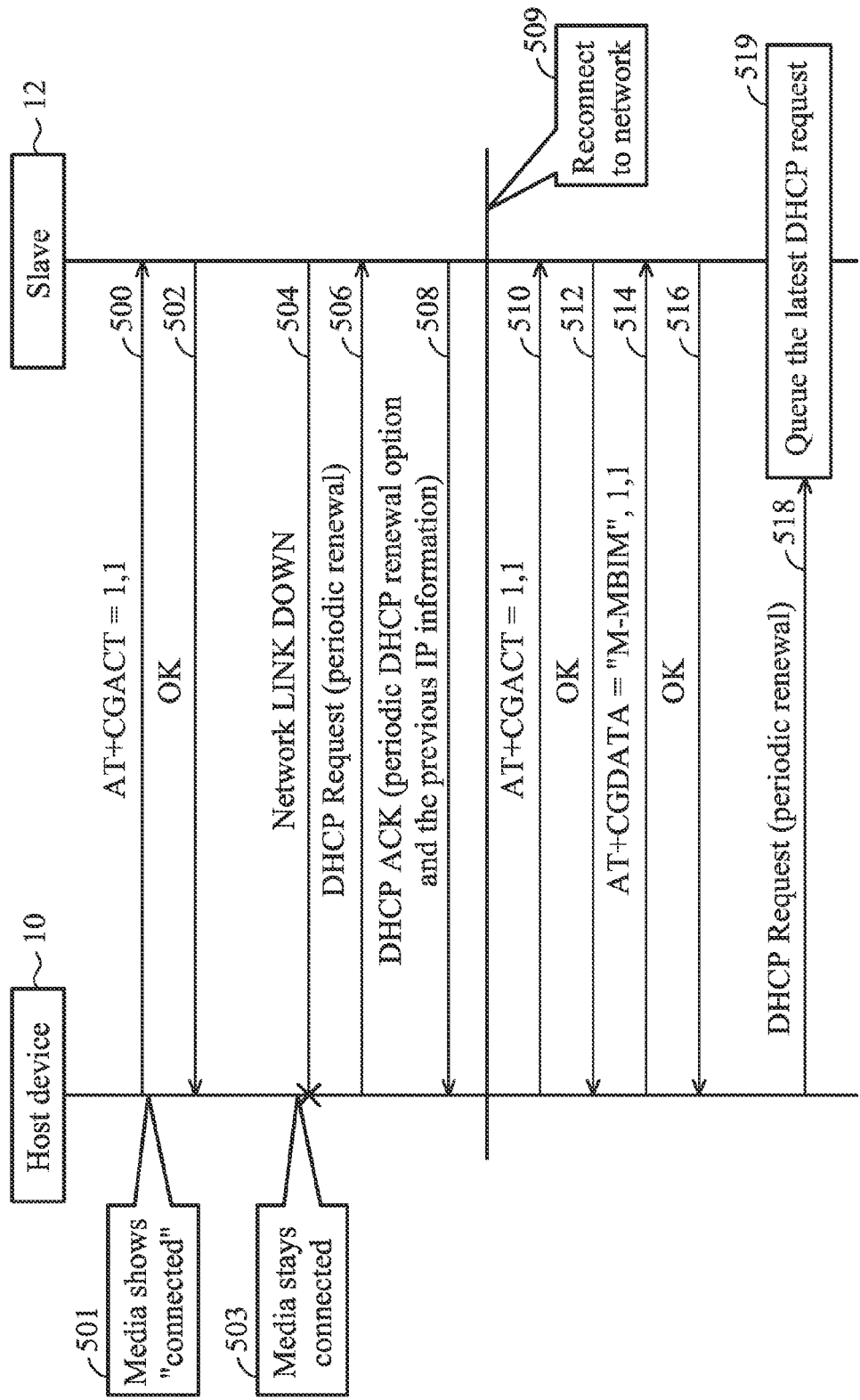
FIG. 5 is a message sequence chart of a DHCP method 5 according to another embodiment of the invention.

FIG. 5 is a message sequence chart of a DHCP method 5 according to another embodiment of the invention, incorporating the host device 10 and slave device 12 in FIG. 1. The host device 10 operates with a network status-unaware operating system such as the Mac OS. The DHCP method 5 is adopted when the network link is disconnected a network reconnection is required.

When the DHCP method 5 starts, a network link has already been established between the slave device 12 and the network 14 and the host device 10 considers itself as being connected. Then a network disconnection occurs and a network LINK DOWN message 504 is sent from the slave device 12 to the host device 10, informing the host device 10 of the broken network link (503), and a network reconnection is required.

Because the host device 10 runs the network status-unaware OS thereon, the host device 10 considers itself as being connected and will continue sending DHCP request messages 506 periodically to renew the IP address, despite the network LINK DOWN message 504. The slave device 12 resolves this condition by responding the DHCP request message 506 with a DHCP acknowledgement message 508 containing a mock IP address. The mock address may be the previous IP address used before the network link breaks, or a predetermined IP address. The DHCP acknowledgement message 508 also contains the DHCP renewal option or the DHCP lease time parameter.

Since the host device 10 is unaware of the broken network link, it will continue sending DHCP request messages S518 according to the renewal period set by the renewal time or lease time parameter. While the slave device 12 is reconnecting the network link, it can queue the latest DHCP request upon reception, and respond with a DHCP acknowledgement message to the host device 10 once the network link is up and operating again.

After a network disconnection, the DHCP method 5 employs the slave device 12 to return a mock acknowledgement message for each DHCP request message, as well as queue the DHCP request message prior to establishing the network link, allowing the network status-unaware host device 10 to update or renew the IP address promptly and accurately, leading to a robust and reliable network connection.

Figure 6:
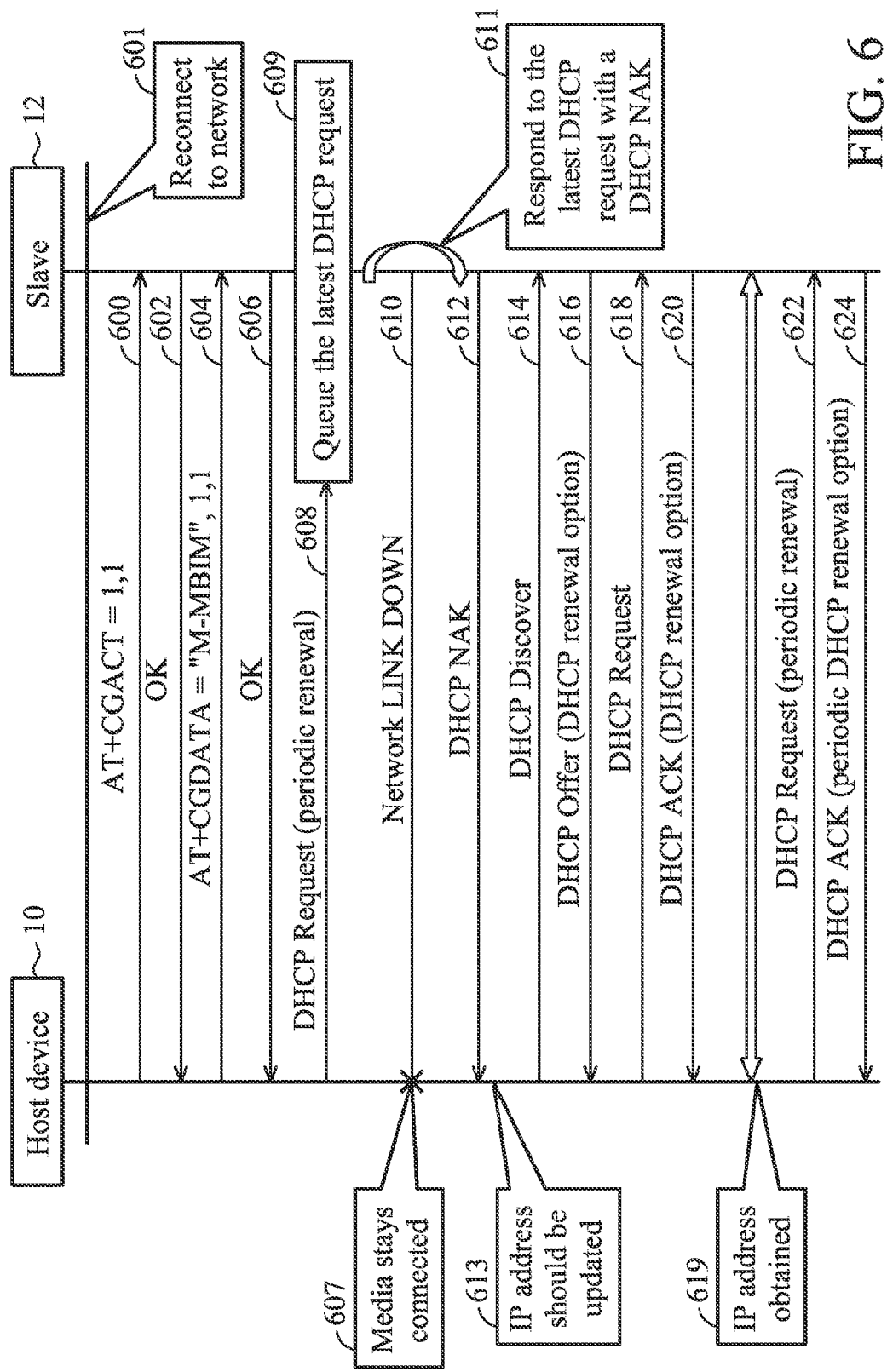
FIG. 6 is a message sequence chart of a DHCP method 6 according to another embodiment of the invention.

FIG. 6 is a message sequence chart of a DHCP method 6 according to another embodiment of the invention, incorporating the host device 10 and slave device 12 in FIG. 1. The host device 10 operates with a network status-unaware operating system such as the Mac OS. The DHCP method 6 is adopted when the network link is disconnected a network reconnection is required.

Accordingly, the host device 10 runs the network status-unaware OS thereon, and considers itself as being connected despite the network LINK DOWN message 504. After the host device 10 sends the DHCP request message 608 to request an IP address renewal, the slave device 12 is configured to queue the DHCP request (609), so that when the network link is broken (610), it can respond the queued DHCP request 609 with a DHCP negative acknowledgement message 612. The slave device 12 can send a network LINK DOWN message 610 to the host device 10, informing of the broken network link.

The host device 10 regards itself as staying connected even after receiving the network LINK DOWN message 610. However, after receiving the DHCP negative acknowledgement message 612, the host device 10 can think the DHCP request for renewing the IP address is declined by the network 14. As a result, the host device 10 will start another DHCP procedure as in Steps 614 through 620.

The operations and configurations of Steps 614 through 620 are identical to those of Step S410 through S416 in FIG. 4, Steps 619 through 624 are identical to those of Step S417 through S420 in FIG. 4, reference therefore can be directed to the preceding paragraphs and will not repeated here again for brevity.

After a network disconnection, the DHCP method 6 employs the slave device 12 to return a negative acknowledgement message to respond the DHCP request message from the host device 10, allowing the network status-unaware host device 10 to update or renew the IP address promptly and accurately, leading to a robust and reliable network connection.

Figure 7:
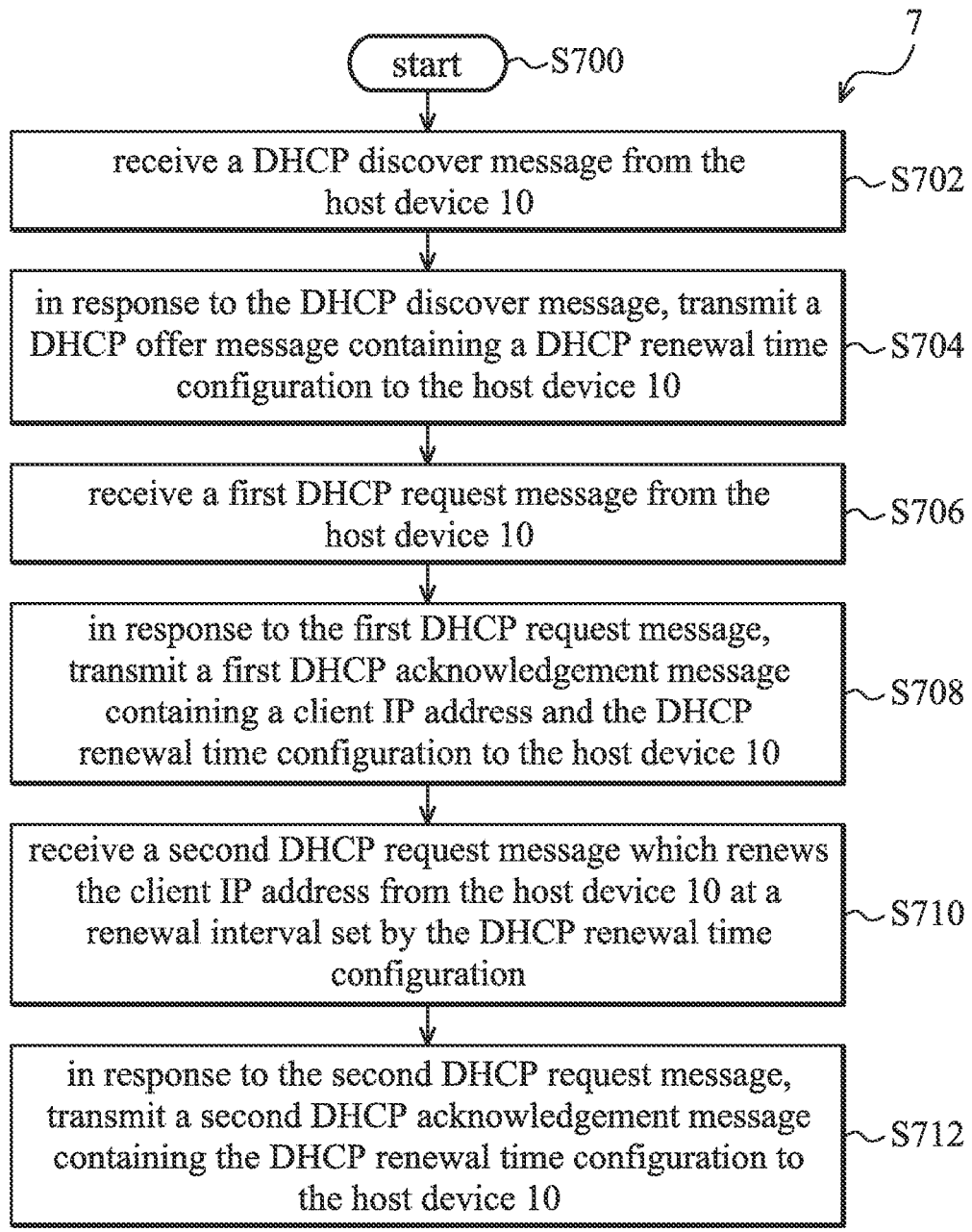
FIG. 7 is a flowchart of a DHCP method 7 according to an embodiment of the invention.

FIG. 7 is a flowchart of a DHCP method 7 according to an embodiment of the invention, adopted by the slave device 12 in FIG. 1. The host device 10 operates with a network status-aware operating system such as the Microsoft Windows. The DHCP method 7 can be adopted by the slave device 12 during a network connection or reconnection.

Upon startup of the DHCP method 7, the slave device 12 is attached to the host device 10, ready to establish a network link with the network 14 and allocate an IP address for the host device 10 (S700). Since the network link has not yet been established, the host device 10 will initiate the DHCP procedure.

To begin with, the slave device 12 receives a DHCP discover message from the host device 10, which enquires the availability of a DHCP server (S702).

In response to the DHCP discover message, the slave device 12 is configured to include a DHCP renewal time configuration or a DHCP lease time configuration in the DHCP offer message, and deliver the DHCP offer message to the host device 10 (S704). The DHCP renewal time configuration and the DHCP lease time configuration are set to be short time intervals. More specifically, the DHCP renewal time configuration is set to be less than 1 minute and the DHCP lease time configuration is set to be less than 2 minutes.

After accepting the DHCP offer message, the host device 10 can acquire the DHCP renewal time or leased time configuration, so the host device 10 can request for or renew an IP address in a period set by the DHCP renewal time configuration or lease time configuration by DHCP request messages. As a result, the slave device 12 is configured to receive a first DHCP request message from the host device 10 in a period set by the DHCP renewal time configuration or lease time configuration (S706). When the lease time parameter is included in the DHCP offer message, the DHCP renewal time may be set as half of the lease time. For example, the lease time parameter may be set as 2 minutes, therefore the slave device 12 may receive first DHCP request message from the host device 10 every minute.

In response to the first DHCP request message, the slave device 12 is configured to transmit a DHCP acknowledgement message which contains an IP address and the DHCP renewal time or DHCP lease time configuration to the DHCP acknowledgement message to the host device 10 (S708). The DHCP renewal time or DHCP lease time configuration in the DHCP acknowledgement message may be set the same as in the DHCP offer message.

After receiving the DHCP acknowledgement message, the host device 10 can use the assigned IP address to communicate with the network 14. Further, the host device 10 will renew the lease time of the IP address in a period set by the DHCP renewal time or lease time configuration by a second DHCP request message. Correspondingly, the slave device 12 is configured to receive the second DHCP request message from the host device 10. The second DHCP request message renews the client IP address from the host device 10 at a renewal interval set by the DHCP renewal time configuration or the lease time configuration (S710). For example, the renewal time configuration may be set at 30 seconds, subsequently the slave device 12 is configured to receive a DHCP request message every 30 seconds.

In response to the second DHCP request message, the slave device 12 is configured to deliver a second DHCP acknowledgement message containing the DHCP renewal time configuration to the host device 10 (S712).

The DHCP method 7 is adopted by the slave device 12 to send a DHCP renewal or lease time parameter to the host device 10 by the DHCP offer message or the DHCP acknowledgement message, allowing the network status-aware host device 10 to promptly update or renew the IP address on the network, leading to a robust and reliable network connection.

Figure 8:
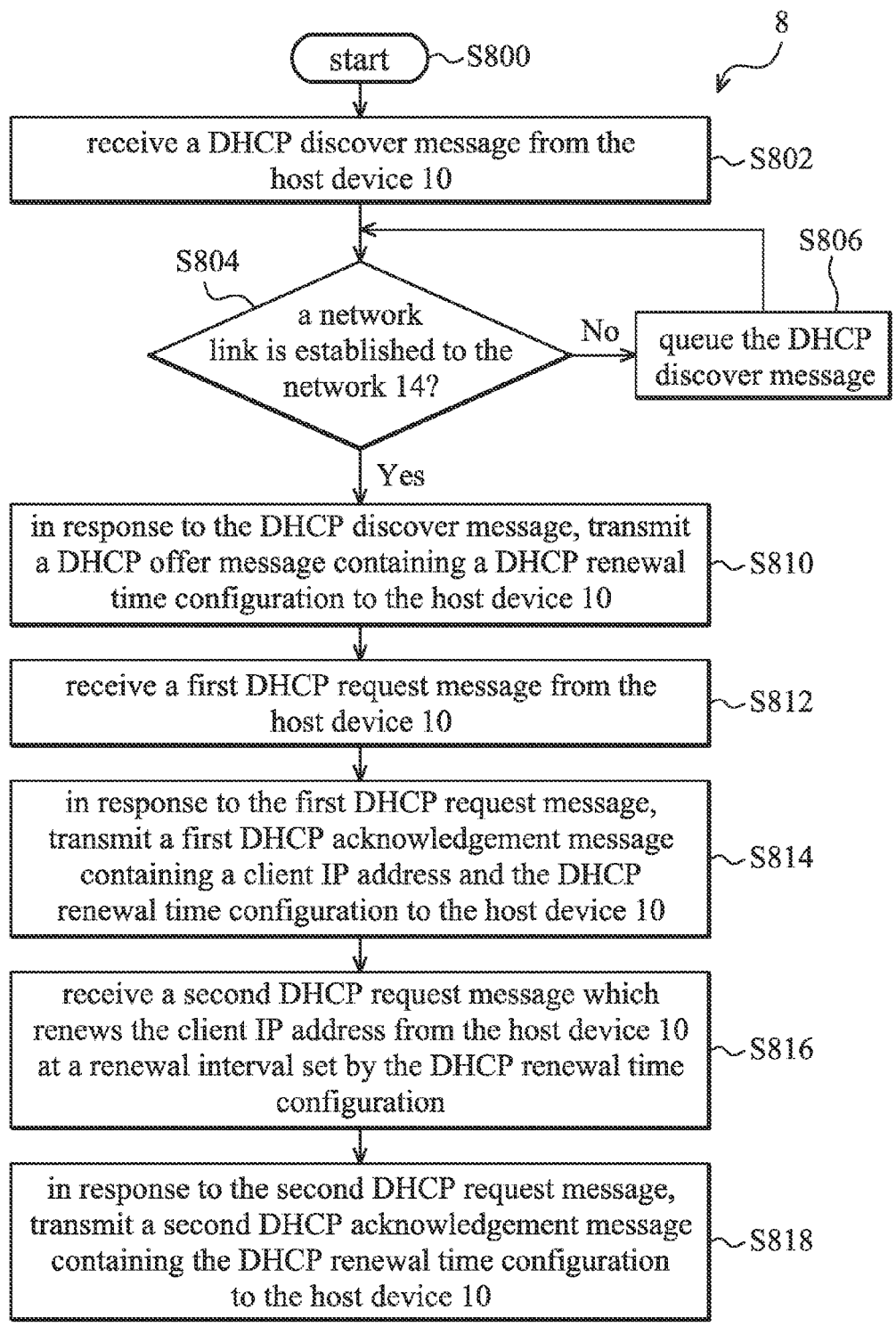
FIG. 8 is a flowchart of a DHCP method 8 according to another embodiment of the invention.

FIG. 8 is a flowchart of a DHCP method 8 according to another embodiment of the invention, adopted by the slave device 12 in FIG. 1. The host device 10 operates with a network status-unaware operating system such as the Mac OS. The DHCP method 8 can be adopted when the slave device 12 has just connected to the host device 10 and required to establish a network connection and acquire a network IP address.

Upon startup of the DHCP method 8, the DHCP client 10 just joins the network 14, and is ready to establish a network link (link) with the network 14 and acquire an IP address from the DHCP server 14 (S800). Since the DHCP client 10 has not yet established the network link, the host device 10 will initiate the DHCP procedure.

The host device 10 will start the DHCP procedure by sending a DHCP discover message, which is received by the slave device 12 (S802). The host device 10 will automatically regard itself as being connected to the network 14 soon after the DHCP discover message is sent.

At this point, the slave device 12 is configured to check whether the network link to the network 14 has been established (S804). If the slave device 12 has not received a network LINK UP message from the network 14, it can determine that the network link has not yet been established, and queue the DHCP discover message just received from the host device 10 (S806). On the other hand, if the slave device 12 has received a network LINK UP message, it can determine that the network link has been established, and return a DHCP offer message to the host device 10 in response to the received DHCP discover message (S810). The slave device 12 is configured to include a DHCP renewal time or a DHCP lease time configuration to the DHCP offer message. The DHCP renewal time configuration and the DHCP lease time configuration are set to be short time intervals. Specifically, the DHCP renewal time configuration is set to be less than 1 minute and the DHCP lease time configuration is set to be less than 2 minutes.

After accepting the DHCP offer message, the host device 10 can acquire the DHCP renewal time or leased time configuration, and request for or renew an IP address in a period set by the DHCP renewal time configuration or lease time configuration by DHCP request messages. As a result, the slave device 12 is configured to receive a first DHCP request message from the host device 10 in a period set by the DHCP renewal time configuration or lease time configuration (S812). When the lease time parameter is included in the DHCP offer message, the DHCP renewal time may be set as half of the lease time. For example, the lease time parameter may be set as 2 minutes, therefore the slave device 12 may receive first DHCP request message from the host device 10 every minute.

In response to the sent first DHCP request message, the slave device 12 can respond with a DHCP acknowledgement message to the host device 10. The DHCP acknowledgement message contains an IP address and the DHCP renewal time or DHCP lease time configuration (S814). The DHCP renewal time or DHCP lease time configuration in the DHCP acknowledgement message may be set the same as in the DHCP offer message.

After receiving the DHCP acknowledgement message, the host device 10 can adopt the assigned IP address to communicate with the network 14. Further, the host device 10 will renew the lease time of the IP address in a period set by the DHCP renewal time or lease time configuration by a second DHCP request message. Correspondingly, the slave device 12 is configured to receive and pass the second DHCP request message from the host device 10 to the network 14. The second DHCP request message renews the client IP address from the host device 10 at a renewal interval set by the DHCP renewal time configuration or the lease time configuration (S816).

In response to the second DHCP request message, the slave device 12 is configured to deliver a second DHCP acknowledgement message containing the DHCP renewal time configuration to the host device 10 (S818).

The DHCP method 8 is adopted by the slave device 12 to queue a DHCP discover message when the network link is not established, and configure a DHCP renewal or lease time parameter to the host device by the DHCP offer message or the DHCP acknowledgement message, allowing the network status-unaware host device to update or renew the IP address in a timely manner, leading to a robust and reliable network connection.

Figure 9:
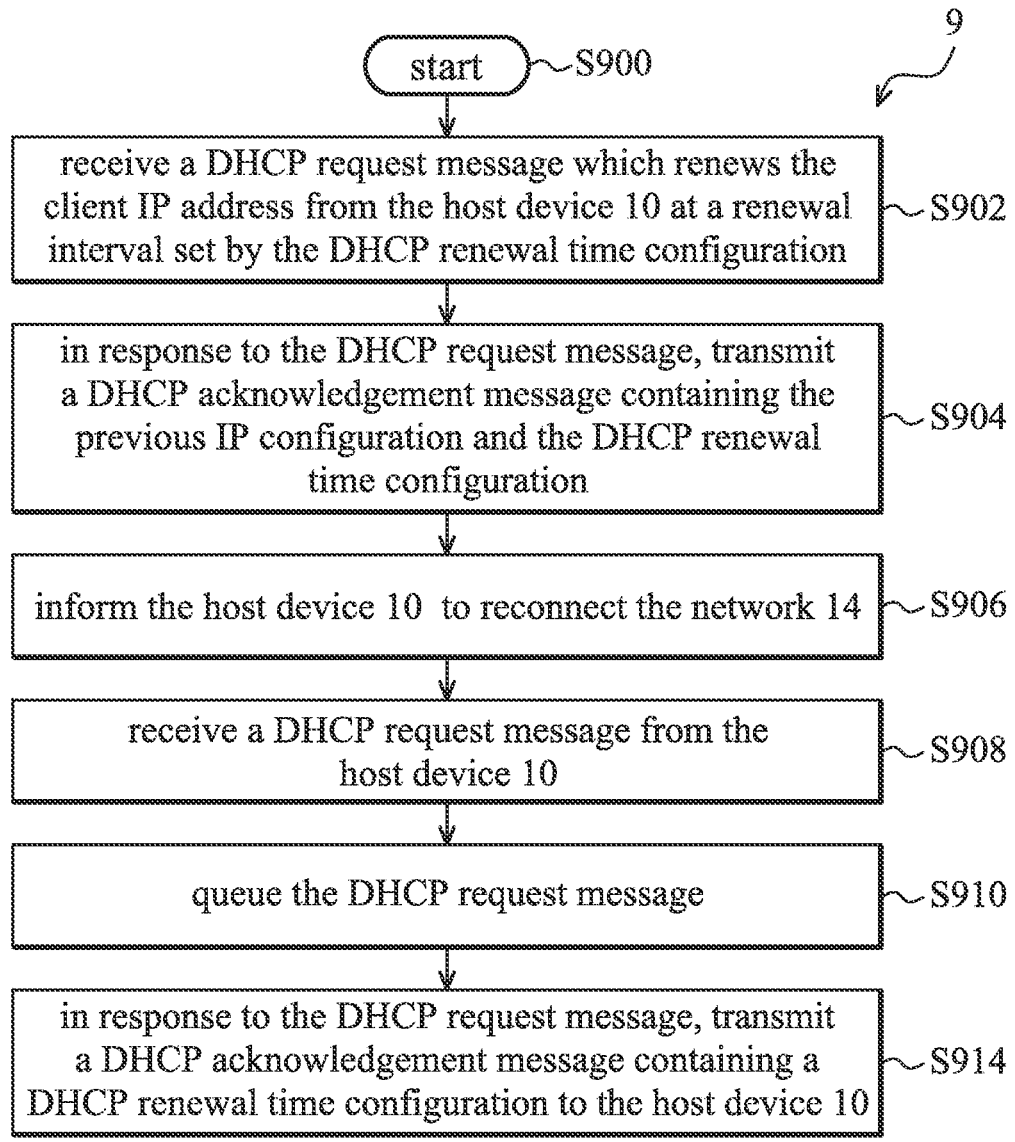
FIG. 9 is a flowchart of a DHCP method 9 according to another embodiment of the invention.

FIG. 9 is a flowchart of a DHCP method 9 according to another embodiment of the invention, adopted by the slave device 12 in FIG. 1. The host device operates with a network status-unaware operating system such as the Mac OS. The DHCP method 9 is adopted when the network link is disconnected and a network reconnection is required, and may be used in conjunction with the DHCP method 8.

Upon startup of the DHCP method 9, the network link is broken and the host device 10 still considers itself as connected (S900). As a consequence, the host device 10 continues sending the DHCP request messages regularly at a renewal interval set by the DHCP renewal time configuration or the DHCP lease time configuration, in an attempt to renew the IP address from the network 14. Correspondingly, the slave device 12 is configured to receive the DHCP request messages regularly at the renewal interval (S902).

In response to the DHCP request message, the slave device 12 is configured to transmit a mock DHCP acknowledgement message containing the previous IP configuration and the DHCP renewal time configuration back to the host device 10 (S904), to prevent the host device 10 from determining that the network is unresponsive and reducing the data rate.

The slave device 12 can then inform the host device 10 to reconnect the network 14 (S906).

While the slave device 12 is waiting for the network link reconnecting, it can still receive a DHCP request message from the host device 10 at every renewal interval (S908) and queue the latest DHCP request message (S910).

After the network link is re-established and operating, the slave device 12 can transmit a DHCP acknowledgement message containing an IP address, as well as a DHCP renewal time configuration to the host device 10 (S914).

The DHCP method 9 is adopted by the network card when the network link is broken, to respond a DHCP request message with a mock DHCP acknowledgement message and queue the DHCP request message, allowing the network status-unaware host device to update or renew the IP address in a timely manner, leading to a robust and reliable network connection.

Figure 10A:
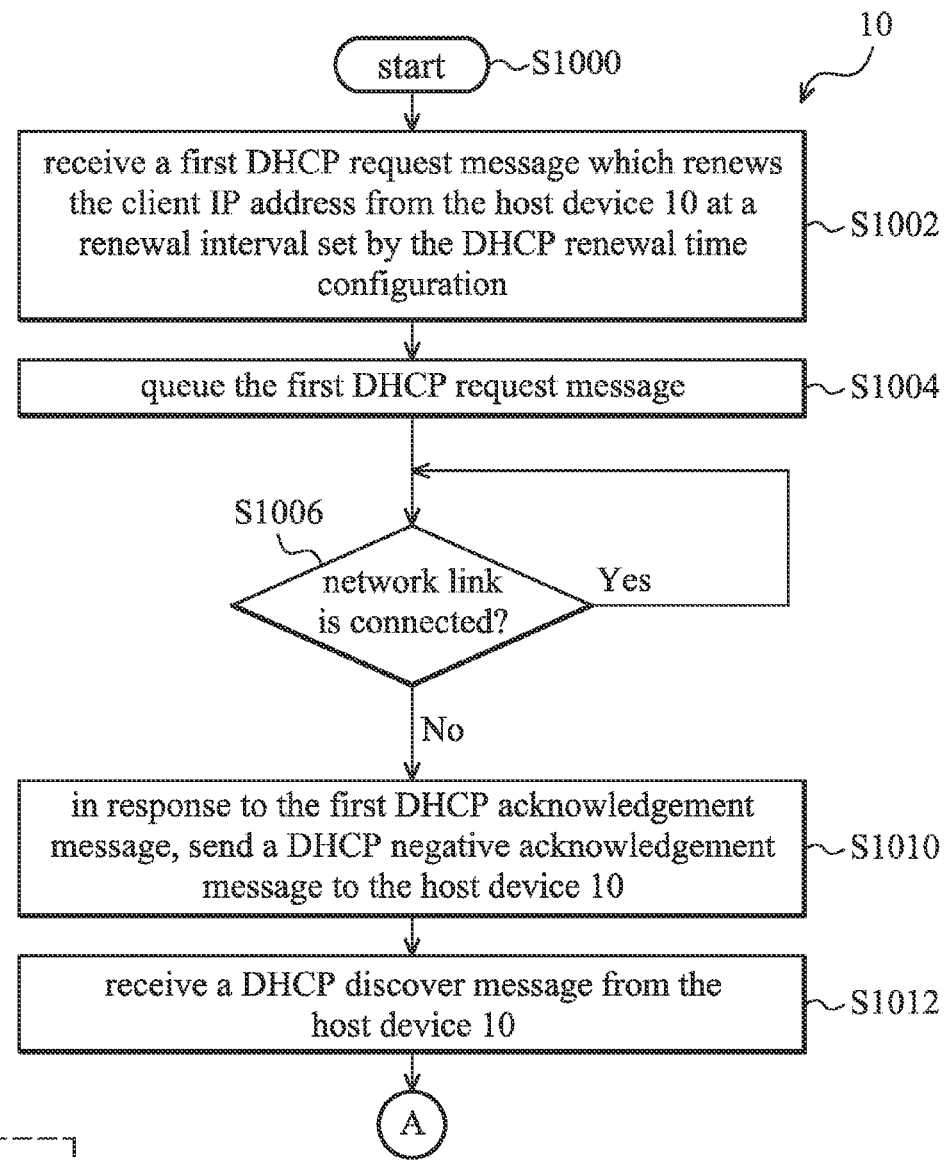
FIGS. 10A and 10B show a flowchart of a DHCP method 10 according to another embodiment of the invention.
Figure 10B:
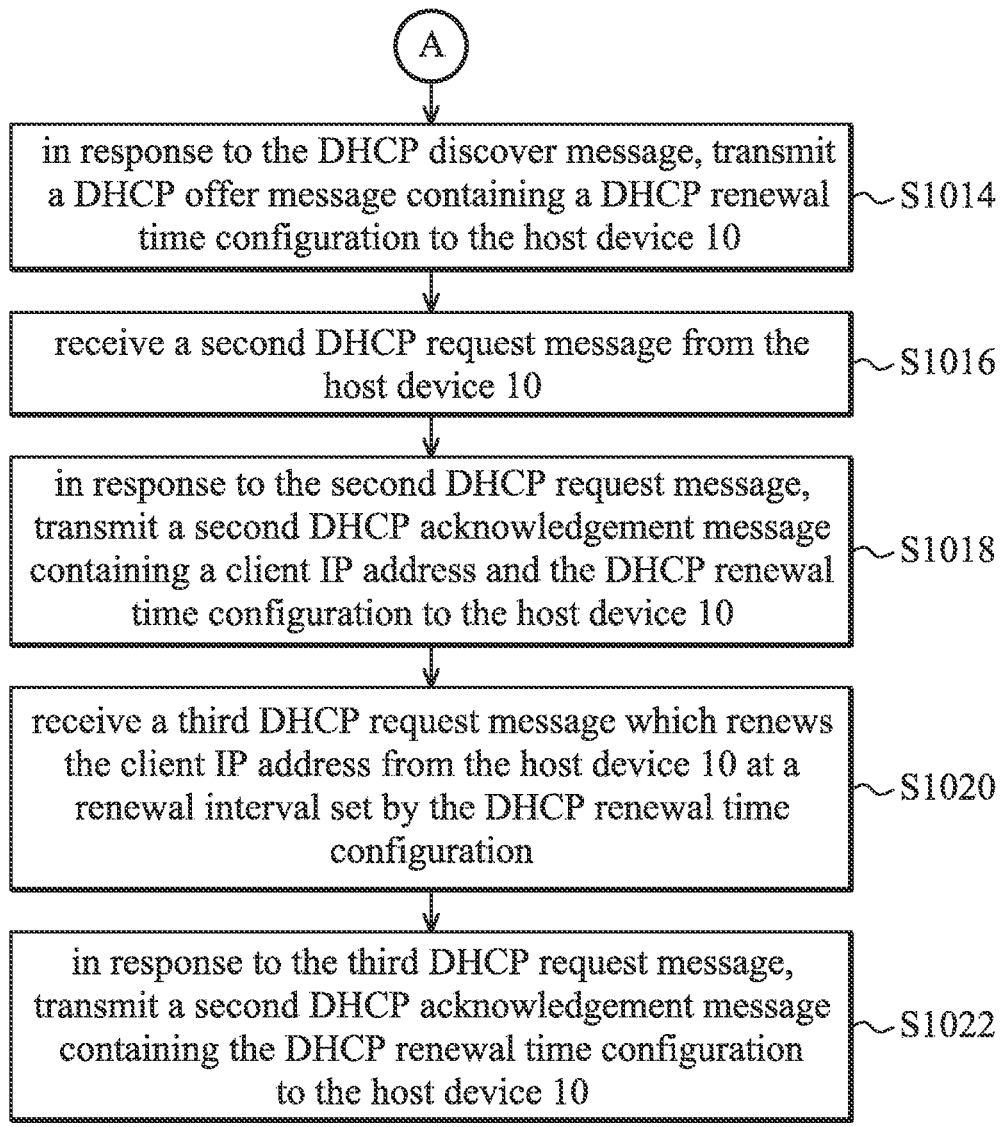

FIGS. 10A and 10B show a flowchart of a DHCP method 10 according to another embodiment of the invention, adopted by the slave device 12 in FIG. 1. The host device 10 operates with a network status-unaware operating system such as the Mac OS. The DHCP method 10 is adopted when the network link is disconnected and a network reconnection is required, and may be used in conjunction with the DHCP method 8.

Upon startup of the DHCP method 10, the network link may or may not be broken, and the host device 10 transmits the DHCP request messages regularly at a renewal interval set by the DHCP renewal time configuration or the DHCP lease time configuration, to renew the IP address from the network 14. Correspondingly, the slave device 12 is configured to receive and queue the first DHCP request messages regularly at the renewal interval (S1002 and S1004).

Next, the slave device 12 is configured to determine whether the network link is connected (S1006). When the network link is connected, the slave device 12 is configured to continue checking the network link status (S1006). When the network link is disconnected, the slave device 12 is configured to send a DHCP negative acknowledgement message to the host device 10 (S1010). The slave device 12 can send a Network LINK DOWN message to the host device 10, informing of the broken network link.

The host device 10 regards itself as staying connected even after receiving the Network LINK DOWN message. However, after receiving the DHCP negative acknowledgement message, the host device 10 can determine the DHCP request for renewing the IP address is declined by the network. As a result, the host device will start another DHCP procedure.

Operations of Steps S1012 through S1022 are identical to those of Steps S802 through S818 in FIG. 8, details therefor can be found in the preceding paragraphs, and will not repeated here again for brevity.

The DHCP method 10 is adopted by the slave device when the network link is broken, to queue the DHCP request message and respond the queue the DHCP request message with a DHCP negative acknowledgement message, allowing the network status-unaware host device to update or renew the IP address on the network, leading to a robust and reliable network connection.

The DHCP methods 2 through 10 may be implemented by hardware circuits which function according to each step, or implemented by a controller or processor which executes codes and instructions in a memory device to function according to each step.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The term "or" used herein is intended to mean an inclusive "or" rather than an exclusive "or." That is, unless specified otherwise, or clear from the context, the phrase "X employs A or B" is intended to mean any of the natural inclusive permutations. In addition, the articles "a" and "an" as used in this application and the appended claims should generally be construed to mean "one or more" unless specified otherwise or clear from the context to be directed to a singular form.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, adopted by a slave device connected to a host device, comprising:
   receiving, by the slave device, a DHCP discover message from the host device;
   queuing, by the slave device, the DHCP discover message until the slave device establishes a first network link with a network;
   transmitting, by the slave device, a DHCP offer message to the host device in response to the DHCP discover message upon the establishment of the first network link, wherein the DHCP offer message comprises a DHCP renewal time configuration;
   receiving, by the slave device, a first DHCP request message from the host device; and
   transmitting, by the slave device, a DHCP acknowledgement message in response to the first DHCP request message, wherein the DHCP acknowledgement message comprises a client Internet Protocol (IP) address and the DHCP renewal time configuration to the host device,
   wherein the method further comprising:
   establishing, by the slave device, a second network link with the network when the first network link is disconnected;
   queuing, by the slave device, a second DHCP request message until the slave device establishes the second network link with the network when the first network link is disconnected, and
   transmitting a second DHCP acknowledgement message to the host device upon the establishment of the second network link.

2. The method of claim 1, wherein the DHCP renewal time configuration is less than 1 minute.

3. The method of claim 1, wherein the step of transmitting the DHCP acknowledgement message comprises:
   when the first network link is disconnected, transmitting, by the slave device, a DHCP acknowledgement message in response to the first DHCP request message, wherein the DHCP acknowledgement message comprises a mock IP address and the DHCP renewal time configuration to the host device.

4. The method of claim 1, further comprising:
   when the first network link is disconnected, transmitting, by the slave device, a DHCP negative acknowledgement message to the host device in response to the second DHCP request message.

5. The method of claim 1, further comprising:
   receiving the second DHCP request message from the host device to renew the client IP address in a renewal period according to the DHCP renewal time configuration.

6. A method, adopted by a slave device connected to a host device, comprising:
   receiving, by the slave device, a DHCP discover message from the host device;
   queuing, by the slave device, the DHCP discover message until the slave device establishes a first network link with a network;
   transmitting, by the slave device, a DHCP offer message to the host device in response to the DHCP discover message upon the establishment of the first network link, wherein the DHCP offer message comprises a DHCP lease time configuration;
   receiving, by the slave device, a first DHCP request message from the host device; and
   transmitting, by the slave device, a DHCP acknowledgement message to the host device in response to the DHCP request message, wherein the DHCP acknowledgement message comprises a client Internet Protocol (IP) address and the DHCP lease time configuration;
   wherein the method further comprising:
   establishing, by the slave device, a second network link with the network when the first network link is disconnected; and
   queuing, by the slave device, a second DHCP request message until the slave device establishes the second network link with the network when the first network link is disconnected, and
   transmitting a second DHCP acknowledgement message to the host device upon the establishment of the second network link.

7. The method of claim 6, wherein the step of transmitting the DHCP acknowledgement message comprises:
   when the first network a link is disconnected, transmitting, by the slave device, a DHCP acknowledgement message in response to the first DHCP request message, wherein the DHCP acknowledgement message comprises a mock IP address and the DHCP renewal time configuration to the host device.

8. The method of claim 6, further comprising:
   when the first network link is disconnected, transmitting, by the slave device, a DHCP negative acknowledgement message to the host device in response to the second DHCP request message.

9. The method of claim 6, further comprising:
   receiving the second DHCP request message from the host device to renew the client IP address in a renewal period less than the DHCP lease time configuration.

* * * * *